(12) United States Patent
Rosenberg et al.

(10) Patent No.: US 9,310,482 B2
(45) Date of Patent: Apr. 12, 2016

(54) METHODS FOR LOCATING AND SENSING THE POSITION, ORIENTATION, AND CONTOUR OF A WORK OBJECT IN A ROBOTIC SYSTEM

(71) Applicant: Ascent Ventures, LLC, Pittsford, NY (US)

(72) Inventors: Samuel Rosenberg, Pittsford, NY (US); Todd Jackson, Walworth, NY (US)

(73) Assignee: Ascent Ventures, LLC, Pittsford, NY (US)

( * ) Notice: Subject to any disclaimer, the term of this patent is extended or adjusted under 35 U.S.C. 154(b) by 537 days.

(21) Appl. No.: 13/786,988

(22) Filed: Mar. 6, 2013

(65) Prior Publication Data

US 2013/0211766 A1 Aug. 15, 2013

Related U.S. Application Data

(63) Continuation-in-part of application No. 13/370,855, filed on Feb. 10, 2012.

(51) Int. Cl.
*G01S 15/06* (2006.01)
*G01B 21/16* (2006.01)
*G01B 21/04* (2006.01)

(52) U.S. Cl.
CPC .............. *G01S 15/06* (2013.01); *G01B 21/042* (2013.01); *G01B 21/16* (2013.01); *Y10S 901/09* (2013.01)

(58) Field of Classification Search
CPC ...... G01B 21/042; G01B 21/16; G01S 15/06; Y10S 901/09
USPC ........... 702/97, 152, 153, 182; 33/503; 901/9; 700/254, 259
See application file for complete search history.

(56) References Cited

U.S. PATENT DOCUMENTS

| | | | |
|---|---|---|---|
| 3,967,242 A | 6/1976 | Isoo et al. | |
| 4,166,543 A | 9/1979 | Dahlstrom | |
| 4,611,296 A | 9/1986 | Niedermayr | |
| 4,674,057 A | 6/1987 | Caughman et al. | |
| 4,718,023 A | 1/1988 | Arora | |
| 4,815,006 A | 3/1989 | Andersson et al. | |
| 4,821,206 A | 4/1989 | Arora | |
| 4,967,370 A | 10/1990 | Stern et al. | |
| 5,046,851 A * | 9/1991 | Morgan | G01B 11/00 29/720 |
| 5,714,674 A | 2/1998 | Tsukuda et al. | |
| 6,138,494 A | 10/2000 | Lee et al. | |
| 6,317,994 B1 | 11/2001 | Mangelsen et al. | |
| 6,321,137 B1 | 11/2001 | De Smet | |
| 6,563,130 B2 | 5/2003 | Dworkowski et al. | |
| 6,571,148 B1 | 5/2003 | Wunder | |
| 6,812,665 B2 * | 11/2004 | Gan | B25J 9/1692 318/568.11 |

(Continued)

*Primary Examiner* — Carol S Tsai
(74) *Attorney, Agent, or Firm* — Brown & Michaels, PC

(57) ABSTRACT

Methods and apparatus enable a robotic system to detect and determine the location, orientation, surface contours, and features of an object that are not otherwise accurately known in order to allow the robotic system to accurately place a pulse/echo layer thickness-gauge ultrasonic transducer gauge onto the surface of the object. The robotic system uses one or more distance measurement sensors to determine the position, orientation, local contour, and other features of the surface in relation to the robot. Another method calibrates an inaccurate distance sensor. Yet another method maintains overall system functionality in a system with multiple distance sensors in the event that one or more of the distance sensors fails. The robotic system may also determine when maintenance is required.

22 Claims, 3 Drawing Sheets

(56) References Cited

U.S. PATENT DOCUMENTS

| | | | |
|---|---|---|---|
| 7,050,937 B2 | 5/2006 | Lee | |
| 7,151,848 B1 * | 12/2006 | Watanabe | B25J 9/1656 382/141 |
| 8,930,025 B2 * | 1/2015 | Ishizaki | B25J 9/1697 700/259 |
| 9,050,729 B2 * | 6/2015 | Hao | B26B 5/001 |
| 2005/0038563 A1 * | 2/2005 | Rauf | B25J 9/1692 700/245 |
| 2009/0084766 A1 * | 4/2009 | Moritz | B23K 26/0876 219/121.72 |
| 2009/0234501 A1 * | 9/2009 | Ishizaki | B25J 9/1697 700/259 |
| 2011/0029131 A1 * | 2/2011 | Ban | B25J 9/1697 700/254 |
| 2011/0184558 A1 | 7/2011 | Jacob et al. | |
| 2012/0239181 A1 | 9/2012 | Gu et al. | |
| 2014/0156072 A1 * | 6/2014 | Ban | B25J 9/1697 700/254 |

* cited by examiner

METHODS FOR LOCATING AND SENSING THE POSITION, ORIENTATION, AND CONTOUR OF A WORK OBJECT IN A ROBOTIC SYSTEM

REFERENCE TO RELATED APPLICATIONS

This is a continuation-in-part application of co-pending application Ser. No. 13/370,855, filed Feb. 10, 2012, entitled "AUTOMATED TESTING AND VERIFICATION OF A ROBOTIC SYSTEM". The aforementioned application is hereby incorporated herein by reference.

BACKGROUND OF THE INVENTION

1. Field of the Invention

The invention pertains to the field of robotic systems. More particularly, the invention pertains to methods for locating an object in the vicinity of a robot and sensing the object position, orientation, contour, and features and methods for autonomously monitoring a robotic system object sensing apparatus for inaccuracies and compensating for any detected inaccuracies.

2. Description of Related Art

A robotic system typically includes one or more robots, tools wielded by the robot, sensors that enable the position of the robot to be sensed or stepper motors that move the positioning joints in steps to discrete angles or locations, firmware built into a robot controller that causes the robot to move in response to commands delivered to the controller, and software that sends commands to the robot controller to cause the robot to perform desired operations.

Robotic systems are employed in automated manufacturing operations in many situations, for example in factories. Of these robotic systems, some are dedicated to a particular task that is performed repetitively with respect to objects without any alteration in robot motion from object to object. Other robotic systems require alteration of the motion of a robot based on variations in object size, orientation, color, or other object characteristics. When a robotic system is designed to perform a particular task on objects whose characteristics vary from object to object, sensors and software are required to enable and control the robotic system to perform that task.

A pulse/echo layer thickness gauge is a measurement device that makes accurate measurements of the thicknesses of coatings applied to manufactured materials. A common application for pulse/echo layer thickness gauges is the measurement of the thickness of paint coatings applied to automotive vehicle bodies. A robotic pulse/echo layer thickness system is a robotic system to which a pulse/echo layer thickness gauge is added. The pulse/echo layer thickness gauge is thus the tool that is manipulated by the robotic system for the purpose of measuring coatings on materials. The entire robotic pulse/echo layer thickness system thus includes one or more industrial robots, one or more distance measurement sensors mounted to the end of the arm of each robot, computer programs that control the robots, and a pulse/echo layer thickness 'tool' mounted to the end of each robot arm.

The pulse/echo layer thickness tool held by each robot includes an ultrasonic transducer. In order to make a measurement, the pulse/echo layer thickness transducer is placed into contact with the test surface with the transducer oriented normal to the surface and the front face of the transducer in contact with the surface. This placement may be difficult for a robotic system to accomplish when the surface position, orientation, and surface contour relative to the robot are not known a priori.

Other applications require similar robotic system capabilities. For example, some color-measurement gauges require placement of instrumentation either above or against a surface. Surface appearance gauges require the positioning of an instrument at a precise distance and orientation from the surface and additionally require the instrument to be moved parallel to the surface contour.

Surface detection and alignment devices and methods in robotic systems are known in the art.

U.S. Pat. No. 3,967,242, entitled "Automatic Working Machine" and issued to Isoo et al. on Jun. 29, 1976, discloses a machine for determining the location and contour of an object from a television image.

U.S. Pat. No. 4,166,543, entitled "Method and Means for Controlling an Industrial Robot" and issued to Dahlstrom on Sep. 4, 1979, discloses methods for detecting and avoiding objects in a pathway moving from a first point to a second predetermined point.

U.S. Pat. No. 4,611,296, entitled "Manipulation Device Such as an Industrial Robot Having at Least One Sensor" and issued to Niedermayr on Sep. 9, 1986, discloses a robotic system with a manipulation device with sensors to provide tactile and force feedback.

U.S. Pat. No. 4,674,057, entitled "Ultrasonic Ranging Control System for Industrial Robots" and issued to Caughman et al. on Jun. 16, 1987, discloses a safety system for detecting unexpected objects in the intended path of a robot using an array of sensors and for stopping robot movement upon such detection.

U.S. Pat. No. 5,714,674, entitled "Reference Position Determination Method for Industrial Robot" and issued to Tsukuda et al. on Feb. 3, 1998, discloses a reference position system using keys and grooves to physically ensure the robot is in a predetermined reference position.

U.S. Pat. No. 6,138,494, entitled "Robot Calibration Tool and Method" and issued to Lee et al. on Oct. 31, 2000, discloses a clear calibration disc the size and shape of a semiconductor wafer used to calibrate the robot for semiconductor manufacturing.

U.S. Pat. No. 6,317,994, entitled "Robot Alignment Apparatus and Method for Using Same" and issued to Mangelsen et al. on Nov. 20, 2001, discloses a robot alignment method using a pointer and a post with a sleeve to confirm alignment.

U.S. Pat. No. 6,563,130, entitled "Distance Tracking Control System for Single Pass Topographical Mapping" and issued to Dworkowski et al. on May 13, 2003, discloses a robotic control system for a laser-cutting application of limp materials in which the material to be cut is placed at a fairly well-controlled position relative to the laser. The control system maintains the cutting head of the laser at a constant distance from the material as it is being cut. The control system measures the distance to the material and continually adjusts the laser cutting head as surface irregularities pass by the laser to produce sharper and more precise cuts. The control system uses laser-based distance sensors to measure the distance to the material surface.

U.S. Pat. No. 4,718,023 and U.S. Pat. No. 4,821,206, both entitled "Ultrasonic Apparatus for Positioning a Robot Hand" and issued to Arora on Jan. 5, 1988 and Apr. 11, 1989 respectively, disclose a robot object sensing apparatus using multiple receivers for locating an object, sensing the orientation of the object surface, and determining the distance to the surface. This apparatus accomplishes the task of locating an object surface that may not be detectable by any one distance sensor by using an approximate position sensing system using multiple distance sensors in multiple orientations. Once the object is sensed by one or more of the multiple sensors in the approximate position sensing system, the orientation of the object surface and the distance to the object surface is sensed by using a separate set of multiple distance sensors that are part of a precision position sensing system.

There are some significant limitations with the prior art described above, in which multiple sensors in multiple orientations are utilized to detect the location and orientation of an object. In many robotic applications, such as those in which a robot is wielding multiple tools, it may not be possible to find a manner in which one or more tools, in combination with multiple distance sensors that need to be mounted in multiple orientations, can be mounted together on the robot such that none of the viewing ranges of the sensors are obstructed by any of the tools.

Another issue with one or more tools being mounted to the robot in combination with multiple distance sensors in multiple orientations is the limitations that these multiple tool and sensor arrangements impose on the ability of the robot to orient one or more tools relative to a work surface to perform a particular task. Work objects may have numerous varied orientations of surfaces relative to the robot. The surfaces may also be located at various distances from the robot. 'Reach' is the ability of a robot to successfully orient one or more tools with respect to the various work surface locations so that the tools can perform a work operation on or over the object surface. Tools are often mounted and arranged on a robot in orientations that optimize the reach capability of the robot. Multiple distance sensors compete with the one or more tools for mounting space and mounting orientations on the robot. The resulting sensor and tool mounting arrangements may degrade the reach capability of the robot and tools.

The use of multiple distance sensors also imposes a requirement that the multiple distance sensors be periodically checked to ensure that they are calibrated and in agreement with each other. For example, a set of three distance sensors is often required in order to sense the orientation of an object surface in three-dimensional space. If one or more of these three distance sensors are out of calibration relative to the other sensors, then there will be errors in the sensed orientation.

The above references are hereby incorporated by reference herein.

SUMMARY OF THE INVENTION

Methods and apparatus enable a robotic system to detect and determine the location, orientation, surface contours, and other features of an object that are not otherwise accurately known in order to allow a robotic system to accurately place a pulse/echo layer thickness gauge ultrasonic transducer onto the surface of the object. The robotic system preferably includes at least one robot arm, at least one positioning joint for positioning the robot arm, at least one distance sensor coupled to the robot arm for measuring the distance to an object surface, a robot controller with computer programs for directing movement of the positioning joint, and a position-determining mechanism for determining each of the positions for the positioning joints or the robot arm, and system control programs. The positioning joints may include one or more rotational joints, one or more translational joints, or at least one rotational joint and at least one translational joint. In some embodiments, the position-determining mechanism includes a plurality of position sensors, which determine the position of the robot. In other embodiments, the position-determining mechanism includes a plurality of stepper motors, where the position of the robot is determined based on the positions of the stepper motors.

The robotic system uses one or more distance measurement sensors to determine the location, orientation, local contours, and features of the surface in relation to the robot. In some embodiments, a single distance measurement sensor is used. Other methods detect and calibrate an inaccurate distance sensor. Yet other methods maintain the overall system functionality in a system with multiple distance sensors in the event that one or more of the distance sensors fails.

DETAILED DESCRIPTION OF THE INVENTION

In preferred embodiments of the present invention, systems and methods enable locating an object and sensing the object surface orientation and distance using only a single distance sensor. This eliminates issues with the sensor viewing range being obstructed by other sensors and minimizes issues with sensor viewing ranges being obstructed by tools. It also minimizes robot reach issues that result from attempts at arranging and orienting multiple distance sensors and tools. In addition, a single sensor system eliminates the additional complexity, cost, weight, calibration, and wiring requirements that are inherent in a multiple sensor system.

Systems and methods accurately locate the position and orientation of a surface relative to the robot in a robotic system. Although the systems and methods are described in terms of a system with a single robot, the systems and methods are equally applicable to a robotic system possessing multiple robots. Furthermore, in order to move a measuring instrument parallel to a surface, the systems and methods also accurately locate and follow surface contours.

In some embodiments, an evaluating program directs the movement of the robot and one or more measurements made by the robot and evaluates the robot positions and measurements. In other embodiments, a directing program directs the movement of the robot and one or more measurements made by the robot and an evaluating program evaluates the robot positions and measurements. In some embodiments, the directing and evaluating programs run on a computer associated with the robotic system, such as a control computer or a tool computer. In some embodiments, the directing and evaluating programs run on the same computer that runs the control programs used to control the movements of the robot. In other embodiments, the evaluating and directing programs are run remotely from a computer not dedicated to the robotic system being evaluated.

Figure 1:
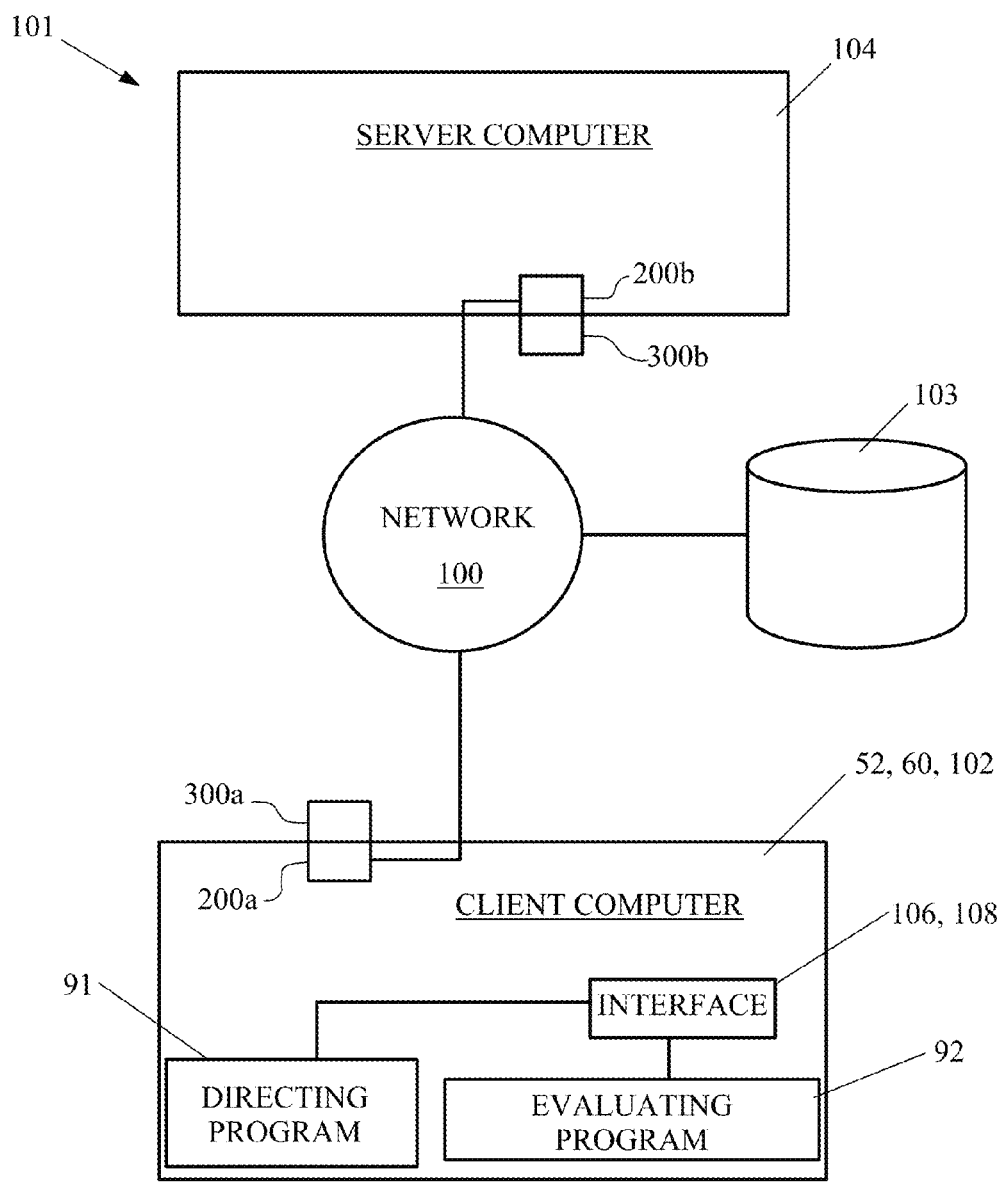
FIG. 1 shows schematically a possible data processing environment in which illustrative embodiments may be implemented.

FIG. 1 is an exemplary diagram of a possible data processing environment in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, a network data processing system 101 is a network of computers in which illustrative embodiments may be implemented. The network data processing system 101 contains a network 100, which is the medium used to provide communication links between various devices and computers connected together within the network data processing system 101. The network 100 may include connections, such as wire, wireless communication links, or fiber optic cables.

In the depicted example, a client computer 102, a repository 103, and a server computer 104 connect to the network 100. In other exemplary embodiments, the network data processing system 101 may include additional client computers, storage devices, server computers, and other devices not shown. The client computer 102 includes a set of internal components 200a and a set of external components 300a, further illustrated in FIG. 2. The client computer 102 may be, for example, a mobile device, a cell phone, a personal digital assistant, a netbook, a laptop computer, a tablet computer, a desktop computer, or any other type of computing device. In some embodiments, the client computer 102 is the control computer 60 or the tool computer 52 of the robotic system of FIG. 3. The client computer 102 may contain a user interface 106 and/or other interfaces 108. The user interface 106 may accept commands and data entry from a user. The user interface 106 can be, for example, a command line interface, a graphical user interface (GUI), or a web user interface (WUI) through which a user can access a directing program 91 and/or an evaluating program 92 on the client computer 102, as shown in FIG. 1, or alternatively on the server computer 104. The server computer 104 includes a set of internal components 200b and a set of external components 300b illustrated in FIG. 2.

In the depicted example, the server computer 104 provides information, such as boot files, operating system images, and applications to the client computer 102. The server computer 104 can compute the information locally or extract the information from other computers on the network 100.

Figure 2:
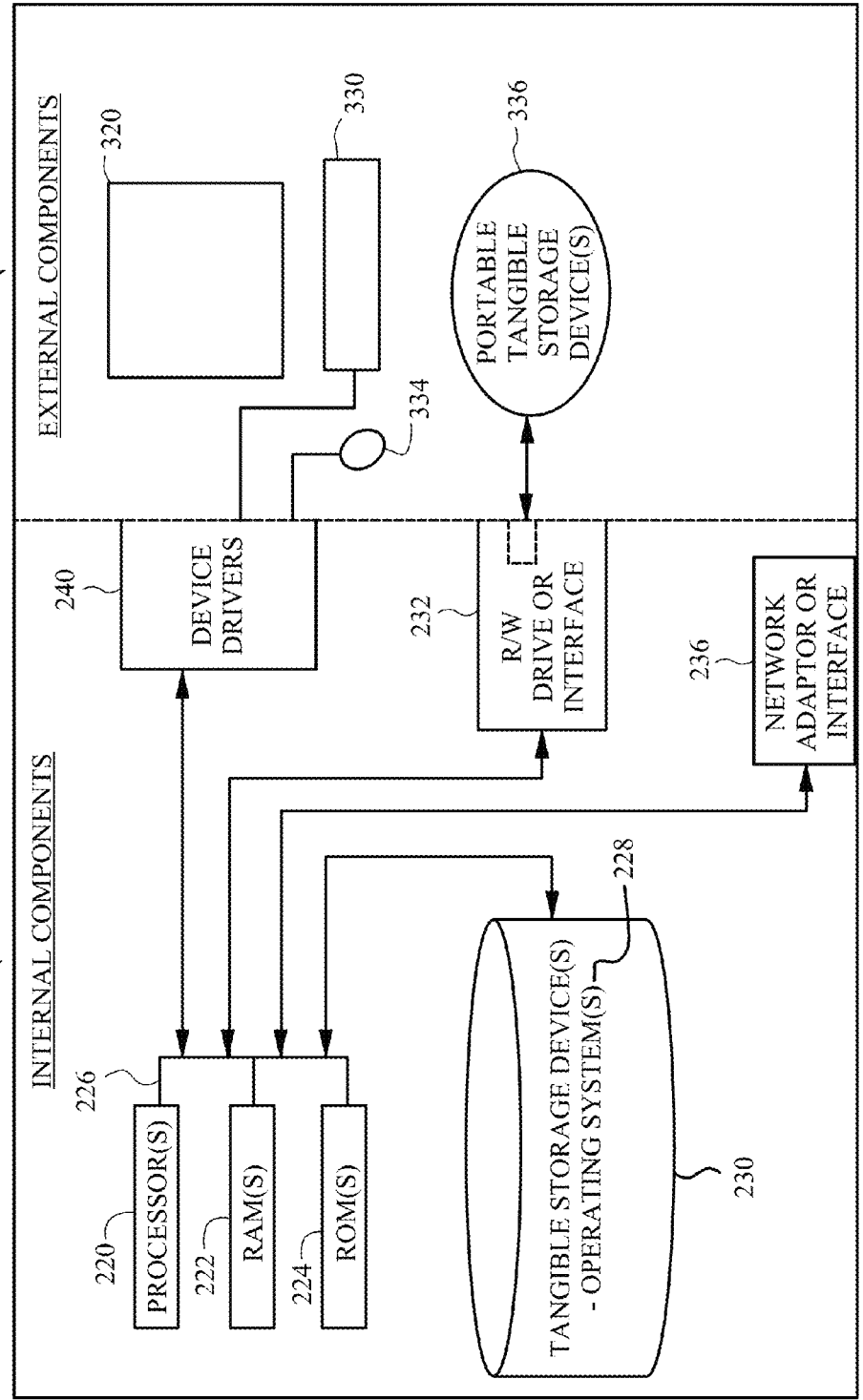
FIG. 2 shows internal and external components of a client computer and a server computer in which illustrative embodiments may be implemented.

Programs such as the directing program 91 and the evaluating program 92 may be stored on at least one of one or more computer-readable tangible storage devices 230 shown in FIG. 2, on at least one of one or more portable computer-readable tangible storage devices 336 as shown in FIG. 2, on a repository 103 connected to the network 100, or downloaded to a data processing system or other device for use. For example, programs such as the directing program 91 and the evaluating program 92 may be stored on at least one of one or more tangible storage devices 230 on the server computer 104 and downloaded to the client computer 102 over the network 100 for use on the client computer 102. Alternatively, the server computer 104 can be a web server, and programs such as the directing program 91 and the evaluating program 92 may be stored on at least one of the one or more tangible storage devices 230 on the server computer 104 and accessed on the client computer 102. The directing program 91 and the evaluating program 92 can be accessed on the client computer 102 through the interface 106. In other exemplary embodiments, programs such as the directing program 91 and the evaluating program 92 may be stored on at least one of one or more computer-readable tangible storage devices 230 on the client computer 102 or distributed between two or more servers.

In some embodiments, the network data processing system 101 is the Internet with the network 100 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the network data processing system 101 may also be implemented as a number of different types of networks, such as, for example, an intranet, a local area network (LAN), or a wide area network (WAN). FIG. 1 is intended as an example, and not as an architectural limitation, for the different illustrative embodiments.

FIG. 2 illustrates internal and external components of the client computer 102 and the server computer 104 in which illustrative embodiments may be implemented. In FIG. 2, the client computer 102 and the server computer 104 include respective sets of internal components 200a, 200b, and external components 300a, 300b. Each of the sets of internal components 200a, 200b includes one or more processors 220, one or more computer-readable RAMs 222 and one or more computer-readable ROMs 224 on one or more buses 226, and one or more operating systems 228 and one or more computer-readable tangible storage devices 230. The one or more operating systems 228, the directing program 91, and the evaluating program 92 are stored on one or more of the computer-readable tangible storage devices 230 for execution by one or more of the processors 220 via one or more of the RAMs 222 (which typically include cache memory). In the embodiment illustrated in FIG. 2, each of the computer-readable tangible storage devices 230 is a magnetic disk storage device of an internal hard drive. Alternatively, each of the computer-readable tangible storage devices 230 is a semiconductor storage device such as a ROM 224, EPROM, flash memory or any other computer-readable tangible storage device that can store a computer program and digital information.

Each set of internal components 200a, 200b also includes a R/W drive or interface 232 to read from and write to one or more portable computer-readable tangible storage devices 336 such as a CD-ROM, DVD, memory stick, magnetic tape, magnetic disk, optical disk, or semiconductor storage device. Enterprise meta-model topic map generator program 91, and version compare meta-model program 92 can be stored on one or more of the portable computer-readable tangible storage devices 336, read via R/W drive or interface 232 and loaded into hard drive 230.

Each set of internal components 200a, 200b also includes a network adapter or interface 236 such as a TCP/IP adapter card. The directing program 91 and the evaluating program 92 can be downloaded to the computer 102 and the server computer 104 from an external computer via a network (for example, the Internet, a local area network or other, wide area network) and a network adapter or interface 236. From the network adapter or interface 236, the directing program 91 and the evaluating program 92 are loaded into hard drive 230. The network may include copper wires, optical fibers, wireless transmission, routers, firewalls, switches, gateway computers, and/or edge servers.

Each of the sets of external components 300a, 300b includes a computer display monitor 320, a keyboard 330, and a computer mouse 334. Each of the sets of internal components 200a, 200b also includes device drivers 240 to interface to the computer display monitor 320, the keyboard 330, and the computer mouse 334. The device drivers 240, the R/W drive or interface 232 and the network adapter or interface 236 include hardware and computer programs (stored in the storage device 230 and/or the ROM 224).

The directing program 91 and the evaluating program 92 can be written in various programming languages including low-level, high-level, object-oriented or non object-oriented languages. Alternatively, the functions of the directing program 91 and the evaluating program 92 can be implemented in whole or in part by computer circuits and other hardware (not shown).

Figure 3:
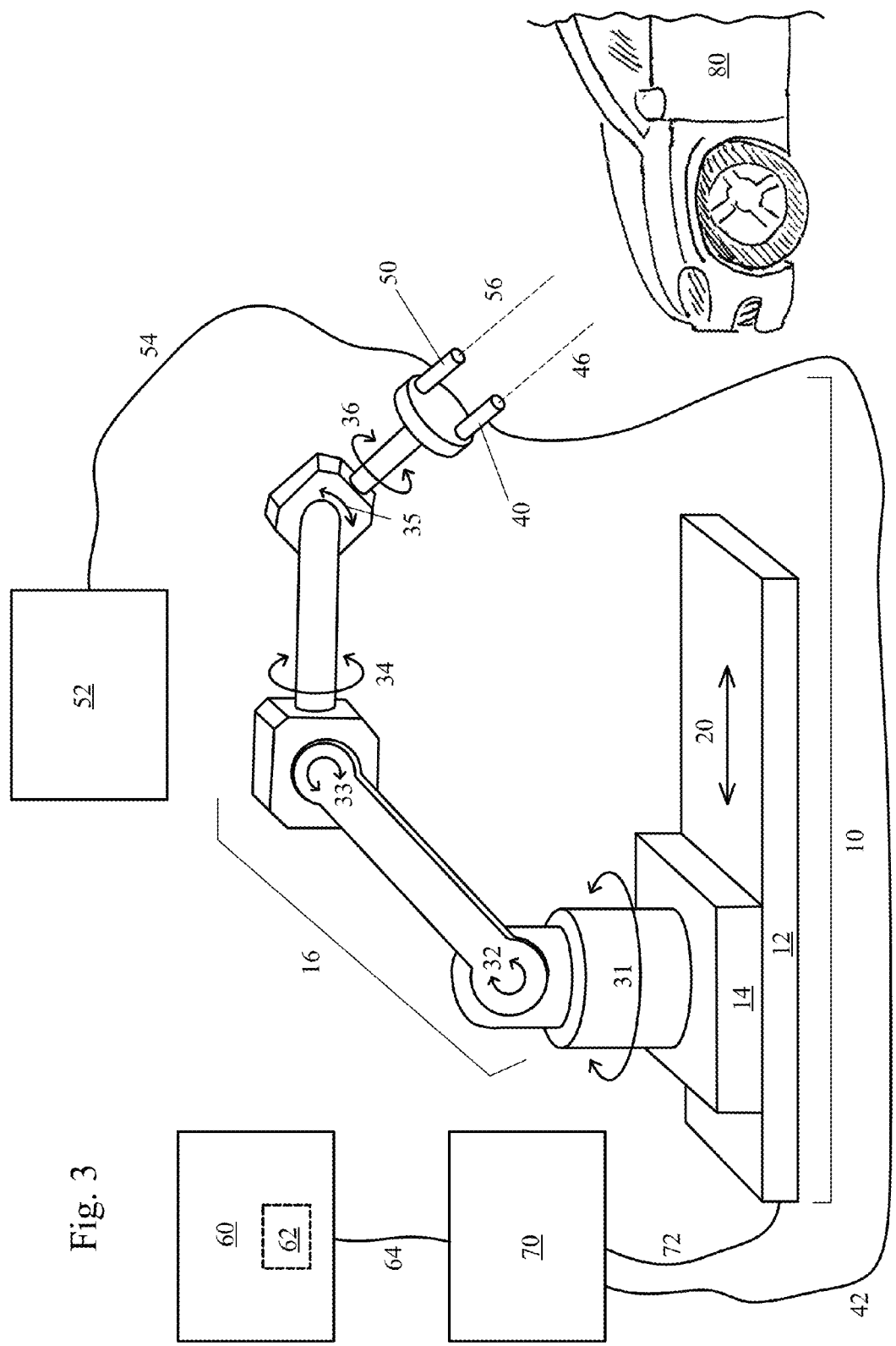
FIG. 3 shows schematically a robotic system in an embodiment of the present invention.

FIG. 3 shows a preferred robotic system for testing using methods of the present invention. The moving parts of the robot 10 sit on a base 12 that is preferably stationary to provide a reference point for the position of the other parts of the robot 10. A stage 14 sits on the base 12 and is translatable with respect to the base 12 along a linear axis 20. The stage 14 houses the memory of the robot, including robot mastering data. The robot arm 16 extends from the top of the stage 14. The robot arm 16 is rotatable along six rotational axes 31, 32, 33, 34, 35, 36, which, in combination with translation along the linear axis 20, allow the robot arm 16 to position tools 40, 50 attached to the end of the arm at a particular location in space with high degrees of precision and accuracy.

A system control computer 60 includes a control program 62 for implementation of methods of the present invention. The system control computer 60 communicates with a robot controller 70 to direct the movement of the robot 10. In some embodiments, the system control computer 60 communicates with the robot controller 70 by way of a cable 64 connecting the system control computer 60 and the robot controller 70, and the robot controller 70 communicates with the robot 10 by way of a cable 72 connecting the robot controller 70 and the robot 10. In other embodiments, communication between the system control computer 60 and the robot controller 70 occurs wirelessly. In other embodiments, communication between the robot controller 70 and the robot 10 occurs wirelessly. In yet other embodiments, both communication between the system control computer 60 and the robot controller 70 and communication between the robot controller 70 and the robot 10 occurs wirelessly. In some embodiments, a tool 40 communicates with the robot controller 70 by way of a cable 42. In other embodiments, communication between the tool 40 and the robot controller 70 occurs wirelessly.

In some embodiments, a tool 50 communicates with a tool computer 52 by way of a cable 54. In other embodiments, communication between the tool 50 and the tool computer 52 occurs wirelessly.

The tools 40, 50 act along longitudinal axes 46, 56, respectively, to interact with a test object 80. In a preferred embodiment, one tool 40 is a distance sensor, the other tool 50 is a pulse/echo layer thickness gauge in communication with a pulse/echo layer thickness computer 52, and the test object 80 is an object with a surface layer thickness to be measured, and, more preferably, a vehicle with paint coating thicknesses to be measured.

For most applications of the systems and methods, the position of the surface is not known to the system prior to the initiation of the methods. The surfaces being sensed are preferably coated surfaces that are preferably rigid and stationary, and an objective of the systems and methods is to quickly map the unknown surface profile in 3D-space prior to placing an object, preferably a tool, perpendicularly against the surface or prior to moving an object parallel to the surface.

The systems and methods preferably:

1) are capable of sensing the position and orientation of curved surfaces;

2) require minimal calibration;

3) are insensitive to differences in distance sensor data in multiple sensor implementations; and 4) automatically test, verify, and calibrate distance sensor accuracy.

In a robotic system, a tool located at the end of the robot is positioned on or near the surface of an object. In some embodiments, the tool is employed to perform an operation with respect to the object, while in other embodiments the robot is commanded to move a tool across the surface of the object, either above the object's surface or in contact with the object's surface.

When the object's position or orientation are not known a priori, one or more object detection sensors in the robotic system are used to determine the object's position and orientation relative to the robot. Data from the object detection sensors, together with software routines, are then used to guide the robot so as to position the tool on or near the surface of the object. The tool is then placed into contact with the object's surface or moved across the object surface, either in contact with the surface or above the surface.

Object detection sensors include, but are not limited to, ultrasonic distance sensors, laser distance sensors, contacting tactile sensors, and camera-based vision systems. The end task performed by the robotic system defines the optimal type and arrangement of sensors that are employed. In some embodiments, the object detection sensors are distance sensors. A distance sensor may be any sensor that remotely measures the distance along a vector from the sensor to the nearest object. In some embodiments, the distance sensor employs infrared light from an infrared light-emitting diode (LED). In some embodiments, the working range of the distance sensor is in the range of about 2 cm to about 20 cm. In other embodiments, the distance sensor uses triangulation from an infrared LED, a red LED, a laser, or a laser diode to remotely measure the distance. In some embodiments, the working range of the distance sensor is in the range of about 4 cm to about 200 cm. In other embodiments, the distance sensor employs ultrasound. In some embodiments, the working range of the distance sensor is in the range of about 3 cm to about 600 cm. In other embodiments, the distance sensor is a sonar sensor. It should be appreciated that although the techniques described herein are described with respect to one or more distance sensors, these techniques are directly extendable to any type of object detection sensor that can detect a point on an object's surface.

No matter what object detection sensor is employed, the sensor exhibits a particular degree of accuracy, and over a sufficiently-long time the sensor's accuracy decreases and the sensor may even fail at some point. This decrease in sensor performance may result in the robotic system exhibiting a loss of accuracy or a decrease in its ability to locate an object upon which it is to perform a desired task. The decrease in sensor accuracy may also result in damage to the object, damage to the tool, or damage to the robot. It is thus desirable to periodically verify the accuracy of the object detection sensors employed in the robotic system to prevent such damage. It is also desirable to automatically and periodically calibrate the object detection sensors. It is further desirable for the robotic system to function acceptably should a sensor fail, either by requesting maintenance, or by switching to one or more alternative or backup sensors.

A position-determining mechanism in a robotic system preferably includes a plurality of position sensors. A position sensor, as used herein, is any sensor or mechanism that measures the position of one or more of the movable portions of the robot, preferably with respect to one or more other portions of the robot. Readings from the position-determining mechanism are used to determine the positions of one or more portions of the robot arm. In some embodiments, the position sensor is a potentiometer. In some embodiments, the position sensor is a linear position sensor. In some embodiments, the working range of the linear position sensor is in the range of about 10 mm to about 50 mm. In other embodiments, the working range of the linear position sensor is in the range of about 20 mm to about 600 mm. In some embodiments, the position sensor is a rotary position sensor. In some embodiments, the working range of the rotary position sensor is in the range of about 5° to about 20°. In other embodiments, the working range of the rotary position sensor is in the range of about 20° to about 160°.

In other embodiments, the position-determining mechanism includes at least one stepper motor and preferably a stepper motor for each robot joint, each stepper motor setting a joint to one of a predetermined number of positions based on a set of discrete positions of the stepper motor. In such embodiments, the position of the robot is determined based on the position settings of the stepper motors and the position-determining mechanism is an inherent function or aspect of the stepper motors used to position the robot joints.

In other embodiments, the position-determining mechanism includes at least one stepper motor and at least one position sensor and preferably a stepper motor or a position sensor for each robot joint.

In some embodiments, an object is detected in the vicinity of a robot, without prior knowledge by the robotic system of the object's location, so as to enable the robotic system to perform a task on the object.

In some embodiments, multiple methods are employed to position a tool located at the end of a robot arm at a specific position and orientation relative to an object's surface without prior knowledge of the position and orientation of the object.

In some embodiments, methods detect an object's surface curvature, contours, or features, without prior knowledge of the object's surface geometry. In some embodiments, methods monitor the accuracy and functionality of a robotic system's object detection sensors and compensate for the failure of one or more of these sensors.

In some embodiments, methods automatically and autonomously calibrate the object detection sensors.

A distance sensor, when mounted onto a robot arm, may be moved by the robot to any point within the range of motion of the robot arm. The position and orientation of the distance sensor on the robot are known by design, preferably by the position-determining mechanism of the robot. Knowledge of the robot position thus defines the position of the distance sensor in the three-dimensional Cartesian space occupied by the robot.

Any distance sensor typically has a defined field of view and minimum and maximum range detection limits. The distance sensor also has a measurement vector, which is the line, usually emanating from the center of the sensor, along which the distance sensor makes its distance measurements. The field of view defines the distance or angle offset from this sensor measurement vector, where the distance sensor may still detect an object. The field of view varies as a function of distance along the measurement vector and is typically narrower at distances that are closer to the distance sensor and broader at distances farther from the sensor. The minimum range limit is the distance along the sensor measurement vector nearest to the sensor from which an object may be detected, while the maximum range limit is the distance farthest from the sensor from which an object may be detected.

If an object is positioned within the field of view of the distance sensor and is also within the minimum and maximum range limits for the distance sensor, then the distance between the sensor and the object may be measured. If the object surface is located outside the field of view of the distance sensor or the object is not located within the minimum and maximum range limits of the sensor, it should be expected that the distance sensor is not able to properly measure the object distance.

If an object is too close to the sensor, then the robot may be instructed to move the sensor away from the object along the sensor's measurement axis until the object is within the minimum measurement range of the sensor. Conversely, if an object is beyond the maximum range of the distance sensor, then the robot may move the sensor forward along the distance sensor's measurement axis until the object is within the distance sensor's maximum measurement range distance.

If an object is located outside the field of view of the distance sensor, the object may be located by instructing the robot to move the sensor along the plane perpendicular to the distance sensor measurement axis until the object enters the sensor's field of view. If the object is not properly detected after translating the sensor along this perpendicular plane, then it is possible that the object is not within the distance sensor's minimum and maximum measurement range. The distance sensor may then be incrementally translated backwards or forwards along the sensor measurement axis, and a translation across the new perpendicular plane may be performed in an effort to detect the object. This process may be done iteratively until the object surface is both within the distance sensor detection range and within the sensor's field of view, at which point the object has been successfully detected.

Alternatively, the robot may rotate the distance sensor angularly about one or more rotational axes in conjunction with incremental translation backwards or forwards along the distance sensor measurement axis in order to detect the object. This process may also be performed iteratively, with angular scanning followed by incremental translation along the distance sensor measurement axis, until the object is within both the distance sensor range and field of view and is thus successfully detected.

Once the distance sensor is directed at an object, so that the object is within the sensor field of view and also within the sensor minimum and maximum detection range, the distance to the object may be accurately measured, and the position of the point on the object's surface that the distance sensor is directed at may be readily computed from the robot position data (Cartesian coordinates), the robot-to-distance-sensor offset, and the measured distance from the distance sensor to the object. However, in many applications, the orientation of the object's surface must also be determined before the robotic system can perform a task on the object.

To determine the orientation and contour of the object's surface in Cartesian space, two or more additional distance measurements are then made at points on the object's surface adjacent to the location of the first point. In some embodiments, these measurements are made by moving the robot so as to direct the same distance sensor at new points on the object surface. In other embodiments, these measurements are made by employing additional distance sensors that are also attached to the robot; these additional distance sensors having measurement axes that intersect different points on the object's surface. Once the multiple distance measurements are made, the distance measurement data, the robot positional data, and the offsets between the robot and the distance sensors enable the Cartesian coordinates for each of the measured points on the object's surface to be calculated using standard geometry.

The position data of the points so measured are used to compute the orientation, and the contour of the object's surface in Cartesian space. In the simple case where the surface of the object is known a priori to be substantially flat, three distance measurements sufficiently describe the surface position and orientation in Cartesian coordinates. For known non-flat surfaces or for surface contours that are not known a priori, the number of measurement points required to describe the surface may be dynamically established. In some embodiments, distance measurements are made on an object with a curved surface until the surface is described in sufficient detail over the desired area in Cartesian space for which the robot will perform a desired operation on the object.

In a preferred embodiment, a pulse/echo layer thickness ultrasonic transducer measures the thickness of coatings on an object surface. To perform such a measurement, the pulse/echo layer thickness transducer is positioned with the transducer axis normal to the object surface and with the front face of the transducer assembly in contact with the surface. An ultrasonic beam emanates from the center of the face of the transducer and is acoustically coupled to the surface measurement location using water.

If the location of the object surface relative to the robot is not known initially, the robot may locate the object surface using a distance sensor and using the methods described herein, until the object surface is within the field of view and within the measurement range of the distance sensor. Three or more distance measurements made at points on the object surface are used to determine the orientation of the object surface relative to the robot and the distance to the surface from the robot. Once the surface orientation and position are known, the robot may be instructed to orient the transducer normal to the surface and the transducer may then be placed into contact with the surface by moving the transducer along the axis normal to the surface, until the transducer makes contact with the object surface.

In order to place the transducer assembly into contact with the surface, the distance to the surface needs to be known. This can be determined directly by using a distance measurement obtained over the placement position point itself or indirectly by utilizing the distance measurements that were obtained when determining the orientation and contour of the object surface.

To determine whether the surface at the measurement point is flat, convex, or concave, the contour of the surface in the vicinity of the measurement point is computed. To do so, distance measurements are made and recorded together with robot positional data so as to determine the Cartesian space coordinates for multiple points on the surface. The contour of the surface may then be determined mathematically.

When the robot places the transducer assembly into contact with the surface, for both convex and flat surfaces, the center of the front face of the transducer assembly is in direct contact with the surface. In these cases, the transducer may be acoustically coupled to the surface by directing a fine mist of water onto the surface prior to placing the transducer into contact with the surface. However, if the surface is concave, only the perimeter of the front face of the transducer assembly is in contact with the object surface. In this case, a stronger mist of water is required to acoustically couple the transducer to the surface so as to fill the concave region between the center of the face of the transducer assembly and the surface. The amount of water required may thus be determined from the surface contour measurements.

The following exemplary method describes in detail how the position of an object, whose position relative to the robot is not known a priori, may be determined.

A robotic system begins the process of locating an object by directing a distance sensor towards an area where an object surface may be located and attempting to obtain a distance measurement. If the object surface is outside the field of view or beyond the maximum range of the distance sensor, then the sensor returns a reading at the maximum end of the distance sensor range. If the object is positioned within the field of view of the distance sensor but too close to the sensor, such that it is located closer than the minimum end of the distance sensor range, the sensor returns a reading at the minimum end of the distance sensor range.

For exemplary purposes, in the case that the distance sensor returns a reading at the maximum end of the distance range, the robotic system needs to determine whether the object is beyond the maximum range or outside the field of view of the distance sensor. The robotic system may initially assume that the object is beyond the maximum range of the distance sensor. In this case, the robot may incrementally translate the distance sensor forward along the sensor measurement axis and attempt a second distance measurement. The process of incrementally translating the distance sensor forward and attempting to make distance measurements may be repeated, until either a distance measurement between the minimum and maximum range of the sensor is obtained or the robot reaches a physical or predetermined position limit.

If, after reaching a physical or predetermined position limit, the distance sensor continues to report a reading at the maximum end of the sensor range, then it may be concluded that the object is outside the field of view of the distance sensor. In this case, the robotic system may translate backwards along the distance sensor measurement axis, returning to its original position along the measurement axis. The robotic system may then incrementally translate the distance sensor along the plane normal to the distance sensor measurement axis and attempt to make a distance measurement. If the distance sensor returns a reading at the maximum end of the distance range, the robotic system may move the distance sensor forward along the sensor measurement axis and obtain further distance sensor readings, until the robot reaches a physical or predetermined position limit.

If, after reaching a physical or predetermined position limit, a distance reading between the minimum and maximum range is not obtained, then the robot may again incrementally translate the distance sensor along the plane normal to the sensor measurement axis in an attempt to bring the object within the sensor field of view. The process of incrementally translating the distance sensor along the plane normal to the sensor measurement axis and then incrementally translating forward along the distance sensor measurement axis may be done iteratively, until the object is within the distance sensor field of view and the distance sensor minimum and maximum range.

In the case that the distance sensor reports a distance reading at the minimum end of the sensor range, the robotic system may assume that the object is within the distance sensor field of view, but that the distance to the object surface is closer than the minimum range for the sensor. In this case, the robotic system may incrementally translate the distance sensor backwards along the distance sensor measurement axis and obtain another distance measurement. If the additional distance measurement is still not above the minimum range of the sensor, then the process of incrementally translating the distance sensor backwards along the distance sensor measurement axis and obtaining additional distance readings may be repeated until the object is beyond the minimum range for the sensor.

The next exemplary method describes in detail how to determine the orientation of an object surface relative to a robot.

To determine the orientation of the object surface relative to the robot, a distance sensor is placed over the target measurement location and a distance measurement is obtained. The distance sensor is preferably then translated 15 mm along a first line, that lies within the plane perpendicular to the distance sensor measurement axis, to a first vertex, and a second distance measurement is obtained. The distance sensor is then translated along the same first line, crossing over the target measurement location, and stopping when the distance sensor has preferentially traversed 15 mm from the position over the target measurement location to a second vertex opposite the first. A third distance measurement at the second vertex is obtained.

A third and fourth vertex are defined along a second line that passes over the target measurement location and is perpendicular to the first line between vertices one and two. The third and fourth vertices are each located on opposite ends of the line, preferably 15 mm from the point along the line that passes over the target measurement location. Fourth and fifth distance measurements from the third and fourth vertices are then obtained. To determine the object surface angular orientation about the line between the first and second vertices, the inverse tangent is computed for the difference between the distance measurements of the third and fourth vertices divided by the 30 mm distance traversed between the two vertices.

In a similar fashion, to determine the object surface angular orientation about the line between third and fourth vertices, the inverse tangent may be computed for the difference between the distance measurements of the first and second vertices divided by the 30 mm distance traversed between the two vertices.

Another exemplary method describes in detail how to determine whether the surface at the previously-described target measurement location is convex, concave, or flat along the axis that passes through the first and second vertices.

For this method, the data previously obtained for determining the orientation of the object surface relative to the robot may be used. First, the X-, Y-, and Z-axis Cartesian coordinate values are computed for the target measurement location and the four vertices that were used to determine the orientation of the object surface. These coordinate values may be readily computed using both the distance measurements and the robot position data that were obtained when the surface orientation was determined.

The Z-axis coordinate values for the first and second vertices along with the target measurement location is then projected onto the cross sectional plane defined by the Z axis and the axis parallel to the first and second vertices. If the projection of the target measurement location point is at a maximum relative to the first and second vertices, the surface contour along the axis between the first and second vertices is convex. If the projection of the target measurement location point is at a minimum relative to the first and second vertices, the surface contour along the axis between the first and second vertices is concave. If the projection of the target measurement location lies along a line between the first and second vertices, the surface contour along the axis between the first and second vertices is flat. This procedure is then repeated to determine the contour along the perpendicular axis that passes through the third and fourth vertices.

In another preferred embodiment, a measurement device or tool is positioned at a predetermined distance from the object's surface rather than being placed into contact with the object. The measurement device is moved in a plane trajectory or along a curved trajectory that maintains the tool at the predetermined distance from, and in a predetermined orientation with respect to, the object's surface. This type of motion is used for non-contacting measurement devices that need to move along or scan an object's surface, including, but not limited to, surface-appearance measurement devices.

For embodiments employing scanning devices, object surface location may be determined as previously described for the pulse/echo layer thickness transducer embodiment. Surface orientation may also be determined as previously described for the pulse/echo layer thickness transducer embodiment by obtaining at least three distance sensor measurements about a single point located approximately in the middle of the scan line, when it is known a priori that the contour is not changing along the scan line. If it is not known a priori whether the contour is changing along the scan line, the at least three distance measurements may be obtained at multiple locations along the scan line, including, but not limited to, the start point, the middle point, and the end point of the scan line. The surface orientation may then be computed at all three locations and the orientation as a function of position along the scan line may be interpolated. To determine the contour of the surface along the scan line, distance sensor measurements at the start and end of the scan line, along with one or more intermediate measurements along the scan line, may be used. In a manner following the method for determining whether the contour at a pulse/echo layer thickness transducer location is convex or concave, the distance sensor measurements at the start and end points of the scan line, along with any intermediate points, are projected onto the plane defined by the distance sensor measurement axis (Z axis) and the axis parallel to the scan line along the surface. The projected Z-axis values define the contour that the robot then uses to maintain the predetermined distance between the scanning measurement device and the object surface.

In some embodiments, it may be necessary to locate the edges, boundaries, or some other distinctive feature of an object surface. The object surface may be located as previously described. Once the object surface has been located, the robotic system may command the robot to incrementally translate the distance sensor along a line parallel to the object surface. For each incremental position along the scan line, the robot may obtain distance measurements to the object surface. These distance measurements may be plotted as a function of incremental position along the scan line. Points of inflection, maxima, minima, and discontinuities along the distance versus position line indicate surface features such as ridges, valleys, and edges. The positional data from these measurements may then be employed to determine the manner in which a pulse/echo layer thickness transducer assembly, a surface appearance gauge, or any other tool is positioned or moved relative to the object surface.

In a preferred embodiment, a pulse/echo layer thickness gauge is used to measure the thickness of coatings applied to a windshield flange on an automobile body to which an automotive windshield is to be affixed. The windshield flange serves as the mounting surface for the vehicle's windshield. The windshield flange is a narrow surface with an inner edge that defines the perimeter of the windshield opening and an outer edge with a ridge. On many automobile assembly lines, the position of the windshield flange relative to the robot varies from windshield to windshield, when vehicles are moved by conveyor to a position near the robot. It is thus necessary for the robotic system to determine the windshield flange location and orientation to ensure that the robot places the pulse/echo layer thickness transducer on the flange surface rather than into the windshield opening or into the ridge along the opposite edge of the flange. One way to properly position the pulse/echo layer thickness transducer assembly is to properly locate the flange by detecting the inner edge, the outer edge, or both edges of the flange, and the flange orientation.

To detect the position and orientation of the inner edge of the narrow flange, the robotic system preferably first generally directs the distance sensor toward the vehicle's large windshield opening. The robotic system, as previously described, preferably translates the distance sensor along the plane perpendicular to the distance sensor's measurement axis until the inner edge of the flange appears within the field of view of the distance sensor and within the minimum and maximum distance range of the sensor. The flange edge is detected at the point where the distance sensor first acquires an in-range distance measurement. If the flange edge is not detected, then the flange may be outside the maximum or inside the minimum measurement range of the distance sensor. Subsequent translations of the distance sensor in planes perpendicular to the distance sensor's measurement axis are then made at positions that are closer to or farther from the vehicle until the edge of the flange is detected.

Once the inner edge of the flange has been detected, the outer edge of the flange is preferably located by continuing to translate the distance sensor along the same translation line. The distance sensor measurement data is continually acquired as the sensor is translated across the flange. Successive distance measurements are either increasing or decreasing as a linear function of unit translation across the flange. When the outer edge of the flange, which includes a ridge, enters the field of view of the distance sensor, there is a sudden step change in the value produced by the distance sensor, which indicates the position of the outer edge of the windshield mounting flange.

Once the inner and outer edges of the windshield flange have been detected, the robotic system then preferably determines the orientation of the flange, if desired, by locating other points along the inner and outer edges of the flange in a manner similar to how the first two points on the inner and outer edges were located. This distance sensor measurement data together with the robot positional data and standard mathematical techniques are then used to determine the position and orientation of the windshield flange relative to the robot. With the flange position and orientation known, the robotic system then preferably places the pulse/echo layer thickness sensor assembly into contact with the windshield flange at one or at multiple positions between the inner and outer edges of the flange to make thickness measurements at that location or those locations.

In some embodiments, a single distance sensor is used, but in other embodiments, the robotic system includes more than one distance sensor. The use of a single distance sensor minimizes sensor cost, but determining the orientation of a surface relative to the robot may require more time given that the distance sensor measurements are made sequentially using the single sensor. The use of multiple distance sensors has the advantage of being able to make multiple distance measurements simultaneously, thus reducing the time required to acquire measurements and to determine object orientation. A system utilizing multiple distance sensors is also less affected by robotic system inaccuracy, as fewer robot motions are required to obtain the distance measurements. However, some disadvantages of using multiple distance sensors include greater sensor cost, greater hardware complexity, potential interference with other devices and tools mounted to the end of the robot arm, and the requirement of ensuring that each of the multiple sensors is calibrated so as to be in agreement with the others. When the sensors disagree, the computed surface orientation and contours may include significant errors, resulting in the robotic system performing a task poorly. Thus, if multiple sensors are to be used, it is desirable to automatically, periodically, and autonomously check the performance of the distance sensors. This testing is also important for a system that employs a single distance sensor.

In the preferred embodiment, several tests are performed to determine whether each distance sensor functions properly.

As a first test, a 'distance sensor repeatability test' is run periodically to evaluate the distance sensor measurement uncertainty and to determine whether the sensor readings are repeatable to within the predetermined precision required. To perform this test, the robotic system moves the distance sensor, which is mounted to the robot arm, so that the distance sensor is aimed at the surface of a stationary test target. The test target position and surface shape are preferably predetermined, and the positional data is programmed into the robotic control system programs, although it is possible for the robotic system to locate and use any suitable test surface, including, but not limited to, a floor, a wall, or a portion of the robot's own body for this repeatability test. The robotic system positions the distance sensor such that the distance between the sensor and the test surface is approximately in the center of the distance sensor's measurement range. This positioning may be performed using data obtained from the distance sensor. The distance sensor does not need to be oriented perpendicular to the test surface but must be held stationary with respect to the surface. A series of distance measurements with the distance sensor being held stationary with respect to the test surface are made and stored in a repository. The measurement value differences are compared to a predetermined tolerance value that is representative of the distance sensor repeatability, and the number of measurement values taken is predetermined to provide statistically valid data on the distance sensor performance. In some embodiments, the predetermined tolerance value is the tolerance value for repeatability of the distance sensor provided by the manufacturer of the distance sensor. The test may be repeated for different distances within the detection range of the distance sensor by repositioning the distance sensor or the test surface.

If the distance sensor fails the distance sensor repeatability test due to above-normal variability in the measurement values obtained, this indicates a problem with the distance sensor, which must be corrected in order for the robotic system to be able to determine object location, object orientation, and object surface contour. When this test fails, the robotic system makes a request for maintenance.

A 'distance sensor verification test' is preferably then run, preferably immediately following the completion of a successful distance sensor repeatability test. The distance sensor verification test verifies the range and linearity of the distance sensor and verifies that the distance sensor measurements agree with the positional data provided by the robot's built-in position-determining mechanism. This test also verifies that the longitudinal axis of the distance sensor is parallel to the axis that is pre-defined in the data used by the robot controller algorithms. To perform the distance sensor verification test, the robotic system is first instructed to aim the distance sensor at a test surface, which may be the test target used in the distance sensor repeatability test or a different predetermined test surface. Once the distance sensor is directed toward the test surface, the distance sensor is translated along its measurement axis until the sensor is positioned at the low end of its operational range relative to the test surface. The distance sensor value and the robot's positional data are each stored in a repository. The robot is then moved a short distance, preferably a fraction of the distance sensor's overall measurement range, away from the test surface along the sensor's measurement axis. The distance sensor value at the new position is recorded and stored in a repository. The difference between the new distance sensor value and the position value computed using the robot's positional data from the position-determining mechanism must be less than the combined predetermined tolerance value of the robot's positional data accuracy and the distance sensor measurement accuracy for a successful test result. Subsequently, the robot moves the distance sensor away from the test surface, preferably in equal small steps, with the difference between the new distance sensor value and the position value computed using the robot's positional data from the position-determining mechanism being compared to the combined predetermined tolerance value of the robot's positional data accuracy and the distance sensor measurement accuracy at each position, until the distance sensor reaches or approaches its maximal measurement range. In order for the robotic system to pass this test, the difference between the distance sensor value and the position value computed using the robot's positional data from the position-determining mechanism must be less than the predetermined tolerance value at each measurement location.

If the robotic system fails the distance sensor verification test, it indicates one or more of the following problems: the distance sensor is not linear, the distance sensor is malfunctioning, the robot is not properly calibrated, or the robot is not moving accurately and precisely. Since the use of the distance sensor is a critical aspect for determining object location, object orientation, and object surface contour, the reasons for failure of the test by the robotic system must be identified and corrected before proceeding with object location, object orientation, and object surface contour determinations. The robotic system preferably requests maintenance in the event this test fails. If the robotic system passes the distance sensor verification test, then the distance sensor is performing properly, and the robot is moving accurately for the types of motions employed in this test.

A distance sensor verification test, as described above, does not require the use of a reference standard. There are, however, alternative tests that may achieve the objectives of the distance sensor verification test. One such alternative test utilizes a reference standard in the form of a stepped calibration block. The calibration block includes a flat base, a flat area parallel to the base that is used to determine the orientation of the calibration block, and various defined levels or steps, which may be in the form of a stair step pattern. The steps are preferably sized to correspond to an increment in the range of the distance sensor. In a distance sensor verification test using a calibration block, the robot first moves to a predetermined programmed fixed position in space that directs the distance sensor to the flat area parallel to the base which may be, for exemplary purposes, near the minimum end of the distance sensor measurement range. For this distance sensor test, a 'normalization routine' is run so that the distance sensor is oriented perpendicular to the block. The distance sensor reading is stored in a repository. The robot then moves laterally so that the distance sensor is positioned over the next step or level down from the flat area parallel to the base. A distance sensor value at the new position is recorded and stored in a repository. The difference between the distance sensor and the defined reference standard step distance is compared to a predetermined tolerance value that is representative of the combined robot positional accuracy and distance sensor accuracy. In some embodiments, the predetermined tolerance value is equal to the combined robot positional accuracy and distance sensor accuracy. The robotic system then moves the distance sensor laterally over each of the remaining successive steps of the calibration block, with the difference in distance sensor measurements being verified against the defined reference standard step distances, until the distance sensor approaches or reaches its maximal range. In order for the robotic system to pass this distance sensor verification test, the difference between the distance sensor readings and the robot positional data at each measurement location must be less than the predetermined tolerance value that is representative of the robot positional accuracy and the distance sensor accuracy for the step size of the calibration block. The robotic system may make a request for maintenance in the event this test fails.

The single distance sensor test may be extended to a robotic system possessing multiple distance sensors as follows. The robotic system is instructed to measure the distance to a single point on a surface using each of the distance sensors in sequence. The measurement data from the sensors must agree, either by indicating the same measurement point location in Cartesian space, or by yielding the same measurement distance when the robot positions each sensor at the same reference location in Cartesian space, for a successful result. Should one sensor not be in agreement, this is an indication that that sensor is out of calibration and that the data from that sensor is invalid. The robotic system may make a request for maintenance in the event this test fails.

Many commercially-available distance sensors may be calibrated by activating a 'teach' instruction for the sensor. This requires the sensor to be positioned at a known distance from an object, activating the teach instruction, and then instructing the distance sensor as to the correct measurement distance. This is preferably performed at two distances, one at or near the low end and the other at or near the high end of the distance sensor's measurement range, after which the distance sensor employs the resultant calibration data when making subsequent measurements. The exemplary method that follows describes how a robotic system may autonomously "teach" or calibrate one or more distance sensors. The robot first moves a distance sensor to a first pre-programmed position. This pre-programmed position places the distance sensor at a first predetermined distance from a reference surface. The first predetermined distance is preferably at or near the low end of the distance sensor range. The reference surface may be any stationary and preferably flat surface that is located in the vicinity of the robot. Once the distance sensor is positioned at the first pre-programmed position, the robot commands the distance sensor to set the low end of the distance sensor range. Next, the robot moves the distance sensor to a second pre-programmed position which places the distance sensor at a second predetermined distance from a reference surface. The second predetermined distance is preferably at or near the high end of the distance sensor range. Once the distance sensor is positioned at the second pre-programmed position, the robot commands the distance sensor to set the high end of the distance sensor range. When both the low and high ends of the distance sensor range have been set, the distance sensor is calibrated.

By using the approaches described herein, it is possible for a robotic system with one or more distance measurement sensors to autonomously detect a distance sensor that is out of calibration and to recalibrate just that sensor. After the sensor has been recalibrated, the robotic system may perform one of the previously-described distance sensor verification tests to determine whether the newly-recalibrated sensor may now be utilized.

If an out of calibration sensor cannot be recalibrated, then the robotic system may compensate for the failed distance sensor by eliminating its use and employing only the other remaining distance sensors for making distance measurements. The robotic system may also make a request for maintenance in the event the distance sensor cannot be recalibrated.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of locating a position and at least one additional feature of an object surface using at least one distance sensor positioned by a robot of a robotic system, the method comprising the steps of:
   a) the robotic system iteratively translating the distance sensor of the robotic system along a sensor measurement axis of the distance sensor across a range of motion of the distance sensor along the sensor measurement axis and incrementally moving the distance sensor, until the object surface lies along the sensor measurement axis, and within a measurement range, of the distance sensor for the robotic system in a first position;
   b) the robotic system obtaining a first distance measurement between the distance sensor and a first point on the object surface with the robotic system in the first position and storing the first distance measurement in a repository;
   c) the robotic system collecting a plurality of first robot positional data for the robotic system in the first position from a robot position-determining mechanism of the robotic system and storing the first robot positional data in the repository;
   d) the robotic system moving the distance sensor to a second position, obtaining a second distance measurement between the distance sensor and a second point adjacent the first point on the object surface with the robotic system in the second position, storing the second distance measurement in the repository, collecting a plurality of second robot positional data for the robotic system in the second position from the robot position-determining mechanism of the robotic system and storing the second robot positional data in the repository;
   e) the robotic system moving the distance sensor to a third position, obtaining a third distance measurement between the distance sensor and a third point adjacent the first point and the second point on the object surface with the robotic system in the third position, storing the third distance measurement in the repository, collecting a plurality of third robot positional data for the robotic system in the third position from the robot position-determining mechanism of the robotic system and storing the third robot positional data in the repository;
   f) the robotic system computing a first location in three-dimensional space for the first point on the object surface by using the first distance measurement and the first robot positional data, a second location in three-dimensional space for the second point on the object surface by using the second distance measurement and the second robot positional data, and a third location in three-dimensional space for the third point on the object surface by using the third distance measurement and the third robot positional data; and
   g) the robotic system computing the at least one additional feature of the object surface using the first location, the second location, and the third location.

2. The method of claim 1, wherein in step a), the substep of incrementally moving the distance sensor comprises incrementally translating the distance sensor in a plane substantially perpendicular to the sensor measurement axis.

3. The method of claim 1, wherein:
   in step d), the substep of moving the distance sensor to a second position comprises translating the distance sensor in the plane substantially perpendicular to the sensor measurement axis to the second position; and
   in step e), the substep of moving the distance sensor to a third position comprises translating the distance sensor in the plane substantially perpendicular to the sensor measurement axis to the third position.

4. The method of claim 1, wherein in step a), the substep of incrementally moving the distance sensor comprises incrementally rotating the distance sensor with respect to the sensor measurement axis.

5. The method of claim 1, wherein:
   in step d), the substep of moving the distance sensor to a second position comprises rotating the distance sensor with respect to the sensor measurement axis to the second position; and
   in step e), the substep of moving the distance sensor to a third position comprises rotating the distance sensor with respect to the sensor measurement axis to the third position.

6. The method of claim 1, wherein the at least one additional feature comprises an orientation of the object surface.

7. The method of claim 6, wherein the object surface is a panel of an automotive body.

8. The method of claim 1, wherein the at least one additional feature comprises a contour of the object surface, and in step g), the robotic system computing the at least one additional feature comprises the robotic system interpolating the contour of the object surface by comparing the first location relative to the second location and the third location.

9. The method of claim 8, wherein the object surface is a panel of an automotive body and wherein the robotic system determines whether the contour is convex or concave.

10. The method of claim 1, wherein the at least one distance sensor comprises a first distance sensor, a second distance sensor, and a third distance sensor, the first distance sensor being located at the first position, the second distance sensor being located at the second position, and the third distance sensor being located at the third position simultaneously.

11. The method of claim 1 further comprising:
   the robotic system moving the distance sensor to at least one additional position, obtaining at least one additional distance measurement between the distance sensor and at least one additional point adjacent the first point, the second point, and the third point on the object surface with the robotic system in the at least one additional position, storing the at least one additional distance measurement in the repository, collecting a plurality of at least one additional robot positional data for the robotic system in the at least one additional position from the robot position-determining mechanism of the robotic system and storing the at least one additional robot positional data in the repository; and
   the robotic system computing at least one additional location in three-dimensional space for the at least one additional point on the object surface by using the at least one additional distance measurement and at least one additional robot positional data.

12. A method of locating a position and at least one additional feature of an object surface using at least one distance sensor positioned by a robot of a robotic system, the method comprising the steps of:

a) the robotic system iteratively translating the distance sensor of the robotic system along a sensor measurement axis of the distance sensor across a range of motion of the distance sensor along the sensor measurement axis and incrementally moving the distance sensor, until the object surface lies along the sensor measurement axis, and within a measurement range, of the distance sensor for the robotic system in a first position;

b) the robotic system obtaining a first distance measurement between the distance sensor and a first point on the object surface with the robotic system in the first position and storing the first distance measurement in a repository;

c) the robotic system collecting a plurality of first robot positional data for the robotic system in the first position from a robot position-determining mechanism of the robotic system and storing the first robot positional data in the repository;

d) the robotic system computing a first location in three-dimensional Cartesian space for the first point on the object surface by using the first distance measurement and the first robot positional data;

e) the robotic system incrementally adjusting the distance sensor to a plurality of additional positions along a path, the robotic system repeating steps b) through d) for each additional position;

f) the robotic system plotting the additional positions as Cartesian Z-axis values along the path; and g) the robotic system analyzing the Cartesian Z-axis values to locate any inflection points, maxima, minima, and discontinuities as additional features of the object surface.

13. The method of claim 12, wherein the path is a line, and in step e), the substep of the robotic system incrementally adjusting the distance sensor comprises the robotic system incrementally translating the distance sensor in the plane substantially perpendicular to the sensor measurement axis.

14. The method of claim 12, wherein the path is an arc, and in step e) the substep of the robotic system incrementally adjusting the distance sensor comprises the robotic system incrementally rotating the distance sensor with respect to the sensor measurement axis.

15. The method of claim 12, wherein the object surface is a flange for an automotive windshield.

16. The method of claim 12, wherein the at least one distance sensor comprises a plurality of distance sensors, the distance sensors being simultaneously located at the positions.

17. A method of verifying an accuracy of a distance sensor controlled by a robot in a robotic system, the method comprising the steps of:

a) the robotic system locating a test surface using the distance sensor;

b) the robotic system moving the distance sensor along a measurement axis of the distance sensor, until the test surface lies along the sensor measurement axis, and within a measurement range, of the distance sensor for the robotic system in a first position;

c) the robotic system measuring a first distance to the test surface using the distance sensor with the distance sensor at the first position and collecting a plurality of first robot positional data for the distance sensor in the first position from a robot position-determining mechanism of the robotic system and storing the first distance and the first robot positional data in a repository;

d) the robotic system repeating steps b) and c) for a plurality of additional positions within the measurement range of the distance sensor; and e) the robotic system comparing a measured change in distances by the distance sensor between at least one pair of the positions of the distance sensor and a calculated change in distances based on the positional data for the at least one pair of the positions to determine whether a difference between the measured change and the calculated change is within a predetermined tolerance for the distance sensor.

18. The method of claim 17, wherein step b) comprises the substeps of the robotic system transmitting a primary ultrasonic signal from the distance sensor to the test surface, receiving a reflected ultrasonic signal reflected from the test surface back to the distance sensor, and calculating the distance based on a time difference between when the primary ultrasonic signal was sent and when the reflected ultrasonic signal was received.

19. A method of verifying an accuracy of a plurality of distance sensors controlled by a robot in a robotic system, the method comprising the steps of:

a) the robotic system moving a first distance sensor of the plurality of distance sensors along a measurement axis of the first distance sensor, until the test surface lies along the sensor measurement axis, and within a measurement range, of the first distance sensor in a first position;

b) the robotic system obtaining a first distance measurement between the first distance sensor and test surface and collecting a plurality of first robot positional data for the first distance sensor in the first position from a robot position-determining mechanism of the robotic system and storing the first distance and the first robot positional data in a repository;

c) the robotic system sequentially moving each additional distance sensor of the plurality of distance sensors to the first position using the first robot positional data and measuring additional distances to the test surface using each additional distance sensor with each additional distance sensor at the first position and storing the additional distance measurements in the repository; and d) the robotic system comparing the first distance and each additional distance to determine whether a difference between the first distance and each additional distance is within a predetermined tolerance for the plurality of distance sensors.

20. The method of claim 19, wherein step b) comprises the substeps of the robotic system transmitting a primary ultrasonic signal from the first distance sensor to the test surface, receiving a reflected ultrasonic signal reflected from the test surface back to the first distance sensor, and calculating the first distance based on a time difference between when the primary ultrasonic signal was sent and when the reflected ultrasonic signal was received.

21. A method of autonomously calibrating a plurality of distance sensors controlled by a robot in a robotic system, the method comprising the substeps of:

a) the robotic system sequentially moving each of the plurality of distance sensors to a previously-programmed first reference position lying in front of a fixed reference surface;

b) the robotic system sequentially activating a first distance sensor calibration signal to calibrate a first distance sensor range limit for each of the plurality of distance sensors;

c) the robotic system sequentially moving each of the plurality of distance sensors to a previously-programmed second reference position lying in front of the fixed reference surface; and
d) the robotic system activating a second distance sensor calibration signal to calibrate a second distance sensor range limit for each of the plurality of distance sensors.

22. A method of autonomously compensating for an out-of-calibration or failed distance sensor in a robotic system comprising an out-of-calibration or failed distance sensor and a functioning distance sensor, the method comprising the substeps of:
a) the robotic system substituting the functioning distance sensor for the out-of-calibration or failed distance sensor by moving the functioning distance sensor to occupy measurement positions that would have been occupied by the out-of-calibration or failed distance sensor;
b) the robotic system obtaining distance measurements from the functioning distance sensor and storing the distance measurements in a repository; and
c) the robotic system utilizing the distance measurements from the functioning distance sensor in place of other measurements that would have been obtained from the out-of-calibration or failed distance sensor.

* * * * *